(12) United States Patent
Kraus et al.

(10) Patent No.: US 11,308,135 B2
(45) Date of Patent: Apr. 19, 2022

(54) DATA PRIORITIZATION THROUGH RELATIONSHIP ANALYSIS MAPPING

(71) Applicant: Sponsorhouse, Inc., San Diego, CA (US)

(72) Inventors: Robert Kraus, Encinitas, CA (US); Scott Tilton, Cardiff, CA (US); Michael Robinson, Del Mar, CA (US); David Lin, San Diego, CA (US)

(73) Assignee: SPONSORHOUSE, INC., San Diego, CA (US)

( * ) Notice: Subject to any disclaimer, the term of this patent is extended or adjusted under 35 U.S.C. 154(b) by 187 days.

(21) Appl. No.: 16/710,971

(22) Filed: Dec. 11, 2019

(65) Prior Publication Data

US 2020/0218740 A1 Jul. 9, 2020

Related U.S. Application Data

(60) Provisional application No. 62/788,002, filed on Jan. 3, 2019.

(51) Int. Cl.
*G06F 16/00* (2019.01)
*G06F 16/28* (2019.01)
(Continued)

(52) U.S. Cl.
CPC .......... *G06F 16/288* (2019.01); *G06F 16/258* (2019.01); *G06F 16/285* (2019.01);
(Continued)

(58) Field of Classification Search
CPC .... G06F 16/288; G06F 16/285; G06F 16/683; G06F 16/258; G06F 16/9536; G06Q 50/01
See application file for complete search history.

(56) References Cited

U.S. PATENT DOCUMENTS

| 8,681,630 B1 | 3/2014 | Gibson .................... G06F 9/54 |
| 9,002,920 B2 | 4/2015 | Deryugin et al. .. H04M 3/5175 |

(Continued)

FOREIGN PATENT DOCUMENTS

| WO | WO 2014/153222 | 9/2014 | ............ G06F 17/30 |
| WO | WO 2014/183089 | 11/2014 | ............ G06F 19/00 |

OTHER PUBLICATIONS

International Search Report and Written Opinion issued in application No. PCT/US19/65737, dated Feb. 25, 2020 (11 pgs).

(Continued)

*Primary Examiner* — Hung Q Pham
(74) *Attorney, Agent, or Firm* — Hayes Soloway P.C.

(57) ABSTRACT

A method for processing data relationships on electronic media sites includes: receiving a first data string and a second data string corresponding to a first account and at least one submission on the electronic media site; determining a content identifier of the at least one submission; correlating the determined content identifier with a database of identified content; determining a value of the at least one indicator to the data relationship between first and second accounts based on: content, context, frequency, recency, and volume of the indicator; receiving a third data string corresponding to the second account; processing the first and third data strings to determine identities of the first and second accounts; assigning a relationship designation between the first and second accounts; and receiving a fourth data string selected from a plurality of data strings according to a priority determined by a plurality of relationship designations.

20 Claims, 5 Drawing Sheets

(51) Int. Cl.
  *G06F 16/9536* (2019.01)
  *G06F 16/683* (2019.01)
  *G06F 16/25* (2019.01)
  *G06Q 50/00* (2012.01)

(52) U.S. Cl.
  CPC ........ *G06F 16/683* (2019.01); *G06F 16/9536* (2019.01); *G06Q 50/01* (2013.01)

(56) References Cited

U.S. PATENT DOCUMENTS

| | | | | |
|---|---|---|---|---|
| 9,020,965 | B1* | 4/2015 | Sehrer | G06Q 50/01 |
| | | | | 707/758 |
| 9,405,597 | B1 | 8/2016 | Luff et al. | G06F 21/44 |
| 9,875,440 | B1 | 1/2018 | Commons | G06N 3/08 |
| 2002/0198766 | A1 | 12/2002 | Magrino | G06Q 10/06 |
| 2006/0042483 | A1 | 3/2006 | Work | G06Q 10/00 |
| 2009/0319436 | A1 | 12/2009 | Andra | G06F 17/2785 |
| 2010/0121857 | A1 | 5/2010 | Elmore et al. | G06F 17/30 |
| 2011/0173214 | A1 | 7/2011 | Karim | G06F 17/30 |
| 2013/0073389 | A1 | 3/2013 | Heath | G06F 15/16 |
| 2013/0110567 | A1 | 5/2013 | Omar | G06Q 10/06 |
| 2013/0218310 | A1 | 8/2013 | Johnson | G06F 17/60 |
| 2014/0156372 | A1 | 6/2014 | Postrel | G06Q 30/0226 |
| 2014/0280209 | A1 | 9/2014 | Kivirauma et al. | |
| | | | | G06F 17/3089 |
| 2014/0289057 | A1 | 9/2014 | Kowal et al. | G06Q 20/0277 |
| 2014/0349750 | A1 | 11/2014 | Thompson et al. | A63F 13/12 |
| 2015/0120717 | A1 | 4/2015 | Kim et al. | G06F 17/3053 |
| 2015/0120721 | A1 | 4/2015 | Kim et al. | G06F 17/30 |
| 2015/0363688 | A1 | 12/2015 | Gao et al. | G06N 3/04 |
| 2016/0019599 | A1 | 1/2016 | Puntori | G06Q 30/0275 |
| 2016/0048754 | A1 | 2/2016 | Wang et al. | G06N 3/04 |
| 2016/0213994 | A1 | 7/2016 | Tilton et al. | A63B 71/00 |
| 2017/0068982 | A1 | 3/2017 | Vangala et al. | G06Q 30/0224 |
| 2017/0277691 | A1 | 9/2017 | Agarwal | G06F 17/3053 |
| 2018/0240147 | A1 | 8/2018 | Stevens et al. | G06Q 30/024 |

OTHER PUBLICATIONS

International Search Report and Written Opinion issued in application No. PCT/US20/039000, dated August 2 8, 2020 (15 pgs).
International Preliminary Report on Patentability issued in application No. PCT/US19/026813, dated Oct. 13, 2020 (8 pgs).
U.S. Appl. No. 14/702,839, filed May 4, 2015.
U.S. Appl. No. 16/380,724, filed Apr. 10, 2019.
U.S. Appl. No. 16/582,948, filed Sep. 25, 2019.
International Search Report and Written Opinion issued in application No. PCT/US19/26813, dated Aug. 7, 2019 (12 pgs).
Knott et al., "An alternate approach to developing a total celebrity endorser rating model using the analytic hierarchy process." International Transactions in Operational Research, vol. 11, No. 1, Jan. 2004, pp. 87-95 (Year: 2004) (9 pgs).
Office Action issued in U.S. Appl. No. 14/702,839, dated Apr. 20, 2018 (15 pgs).
Office Action issued in U.S. Appl. No. 14/702,839, dated Aug. 28, 2018 (13 pgs).
Office Action issued in U.S. Appl. No. 14/702,839, dated Aug. 25, 2017 (7 pgs).
Office Action issued in U.S. Appl. No. 14/702,839, dated Dec. 26, 2017 (10 pgs).
Office Action issued in U.S. Appl. No. 14/702,839, dated Mar. 25, 2019 (13 pgs).
Pikas et al., "Assessing the Qualities of Athlete Endorsers: A Study of Consumer Preferences for the 3 Qualities of Sports Endorsers." Journal of Marketing Development and Competitiveness, vol. 6, No. 3, Aug. 2012, pp. 42-55 (Year: 2012) (15 pgs).
U.S. Appl. No. 16/380,724, filed Apr. 10, 2019, Tilton et al.
U.S. Appl. No. 16/582,948, filed Sep. 25, 2019, Tilton et al.
Office Action issued in U.S. Appl. No. 16/582,948 dated Jun. 24, 2021, 37 pgs.
International Preliminary Report on Patentability issued in PCT/US19/64737 dated Jun. 16, 2021, 8 pgs.
Beres, A. "Sentiment Analysis Framework Organization Based on Twitter Corpus Data", Scientific Bulletin of the "Petru Maior", University of Targu Mures, vol. 9, No. 1, 2012, pp. 22-25.
Notice of Allowance issued in U.S. Appl. No. 16/582,948, dated Oct. 22, 2021, 24 pgs.

* cited by examiner

200

Receive a first data string having identification information corresponding to a first account on an electronic media site
210

↓

Receive a second data string having content information corresponding to at least one submission on the electronic media site by the first account
220

↓

Determine a content identifier of the at least one submission by applying an analytical processing function to the second data string, wherein the analytical processing function comprises at least one from the group consisting of: key word identification, proximity word identification, image feature detection, language modeling, and sound fingerprinting
230

↓

Correlate the determined content identifier of the at least one submission with a database of identified content to identify at least a portion of the content corresponding to at least one indicator of a data relationship between the first account and a second account on the electronic media site
240

Determine a value of the at least one indicator to the data relationship between the first and second accounts, wherein the value of the at least one indicator is based on a product of: a content of the indicator, a frequency of the indicator, a recency of the indicator, and a volume of the indicator
250

↓

Receive a third data string having identification information corresponding to the second account
260

↓

Process the first and third data strings to determine identities of the first and second accounts
270

↓

Assign a relationship designation between the first and second accounts based on the determined value and the determined identities of the first and second accounts
280

Receive a fourth data string selected from a plurality of data strings according to a priority determined by a plurality of relationship designations between the second account and a plurality of other accounts including the first account, wherein the fourth data string has content information corresponding to at least one submission on the electronic media site by the first account
290

FIG. 2C

DATA PRIORITIZATION THROUGH RELATIONSHIP ANALYSIS MAPPING

CROSS REFERENCE TO RELATED APPLICATION

This application claims benefit of U.S. Provisional Application Ser. No. 62/788,002 entitled, "Data Prioritization Through Relationship Analysis" filed Jan. 3, 2019, the entire disclosure of which is incorporated herein by reference.

FIELD OF THE DISCLOSURE

The present disclosure is generally related to prioritizing data and more particularly is related to using data relationships to determine priority for data collection and use.

BACKGROUND OF THE DISCLOSURE

The global sports economy encompasses some $300 billion in media consumption, advertisements, sponsorships, merchandise, ticket sales, and more. Investors, whether sponsors, advertisers, or property owners, need to know how to value their investment deals in order to determine the potential for return. In the past, value measurements could be assessed based on attendance revenue, viewership of events, and sales of merchandise. However, as the Internet has given rise to social media and virtual networking platforms, video sites, and other nontraditional engagement methods, it has become more difficult to measure the value of an investment with traditional methods.

In particular, one problem that arises from online social platforms is processing new information. Social media and sharing sites create a constantly-growing source of interactions between the various entities athletes, teams, agencies, and fans. These entities can create new accounts, follow each other, submit content to one another, and use hashtags or @mentions to tag other entities. It can be difficult to discover, catalogue, and analyze all of these new interactions, let alone interpret them to provide useful contextual information. Further, once the interactions are identified, they must be interpreted. This, even as new sources of interactions continue to proliferate. There is currently no effective system to read, interpret, and put to use the information gleaned from these interactions.

Thus, a heretofore unaddressed need exists in the industry to address the aforementioned deficiencies and inadequacies.

SUMMARY OF THE DISCLOSURE

Embodiments of the present disclosure provide methods processing data relationships on electronic media sites. In this regard, one embodiment of such a method, among others, can be broadly summarized by the following steps: receiving a first data string having identification information corresponding to a first account on an electronic media site; receiving a second data string having content information corresponding to at least one submission on the electronic media site by the first account; determining a content identifier of the at least one submission by applying an analytical processing function to the second data string, wherein the analytical processing function comprises at least one from the group consisting of: key word identification, proximity word identification, image feature detection, language modeling, and sound fingerprinting; correlating the determined content identifier of tire at least one submission with a database of identified content to identify at least a portion of the content corresponding to at least one indicator of a data relationship between the first account and a second account on the electronic media site; determining a value of the at least one indicator to the data relationship between the first and second accounts, wherein the value of the at least one indicator is based on a product of: a content of the indicator, a context of the indicator, a frequency of the indicator, a recency of the indicator, and a volume of the indicator; receiving a third data string having identification information corresponding to the second account; processing the first and third data strings to determine identities of the first and second accounts; assigning a relationship designation between the first and second accounts based on the determined value and the determined identities of the first and second accounts; and receiving a fourth data string selected from a plurality of data strings according to a priority determined by a plurality of relationship designations between the second account and a plurality of other accounts including the first account, wherein the fourth data string has content information corresponding to at least one submission on the electronic media site by the first account.

The present disclosure can also be viewed as providing a computer-implemented system for processing data relationships on electronic media sites using a computerized device having a processor and a memory, wherein the processor is configured for executing steps. Briefly described, in architecture, one embodiment of the system, among others, can be implemented through the following computer-implemented steps: receiving, by the processor, a first data string having identification information corresponding to a first account on an electronic media site; receiving, by the processor, a second data string having content information corresponding to at least one submission on the electronic media site by the first account; determining, by the processor, a content identifier of the at least one submission by applying an analytical processing function to the second data string, wherein the analytical processing function comprises at least one from the group consisting of: key word identification, proximity word identification, image feature detection, language modeling, and sound fingerprinting; correlating, by the processor, the determined content identifier of the at least one submission with a database of identified content to identify at least a portion of the content corresponding to at least one indicator of a data relationship between the first account and a second account on the electronic media site; determining, by the processor, a value of the at least one indicator to the data relationship between the first and second accounts, wherein the value of the at least one indicator is based on a product of: a content of the indicator, a context of the indicator, a frequency of the indicator, and a volume of the indicator; receiving, by the processor, a third data string having identification information corresponding to the second account; processing, by the processor, the first and third data strings to determine identities of the first and second accounts; assigning, by the processor, a relationship designation between the first and second accounts based on the determined value and the determined identities of the first and second accounts; and receiving, by the processor, a fourth data string selected from a plurality of data strings according to a priority determined by a plurality of relationship designations between the second account and a plurality of other accounts including the first account, wherein the fourth data string has content information corresponding to at least one submission on the electronic media site by the first account.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2C are a complete flow chart illustrating a method for processing data relationships on electronic media sites, in accordance with the first exemplary embodiment of the present disclosure.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many aspects of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

Some aspects of the invention may also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

Figure 1:
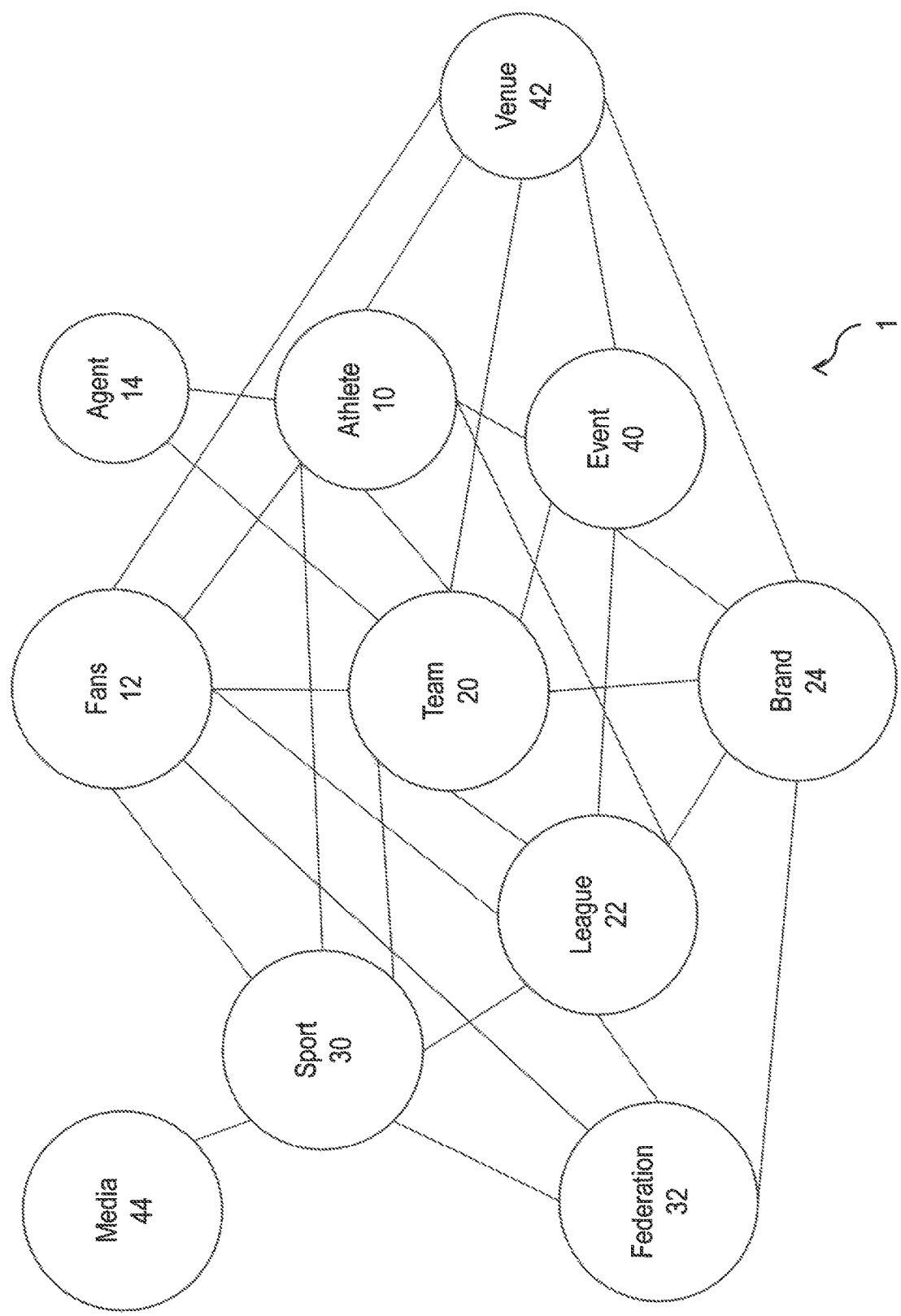
FIG. 1 is an illustration showing several categories of sports entities and their potential relationships to each other, in accordance with a first exemplary embodiment of the present disclosure.

FIG. 1 is an illustration 1 showing several categories of sports entities and their potential relationships to each other. The sports entities and relationships shown are intended to be exemplary only, and are not intended to limit the scope of this disclosure. The sports entities may be any distinct groups of people or organizations within sports. For example, sports entities may include teams 20, athletes 10, fans 12, leagues 22, sport organizations 30 (such as the National Football League and Major League Baseball), federations 32 (such as FIFA, for soccer), agents 14, sports venues 42, sports brands 24, and media groups 44. The sports entities may maintain relationships with one another in the course of business. The relationships may vary depending on the way the entities interact. For example, a team 20 may maintain business relationships with its sport organization 30, league 22, brand 24, athletes belonging to the team 10, fans of the team 12, venues 42, and event organizers 40.

Additional categories of sports entities may be included in the scope of this disclosure. Furthermore, multiple entities in each category may have unique relationships with other entities. For example, the category "fans" may be divided into several different subcategories based on demographic or other characteristics. Thus, an athlete may have a number of relationships with subcategories of fans, or even individual fans. Likewise, a number of subcategories may exist for each sport, agent, team, athlete, league, and so on.

Electronic media sites are online platforms for consuming, posting, and sharing media. Some common electronic media sites are social media and virtual networking sites such as Facebook®, Twitter®, and YouTube®. Other electronic media sites may include blogs, news sites, sports statistic sites, and the like. These sites allow users to create accounts, post content, and check content from other posters.

Sports entities often create accounts on electronic media sites so that they can post content and connect with other sports entities. For instance, a sports team may create a Twitter® account to post game schedules, solicit fan submissions, and share event photography. Athletes playing for the sports team may create individual accounts and may interact with the team account from time to time. Fans may subscribe to or follow the team and athlete feeds. Fans, athletes, and teams may all submit posts mentioning or tagging each other through @mentions or hashtags. Hashtags may be created by users at will and may be any combination of terms. @mentions may refer to any user on the site, not just previously-followed users.

The ability of account users to generate references at will presents a technological problem rooted in electronic media sites. This problem is that, for software systems that track sports entities on electronic media sites, there is a deluge of new connections from unknown or unverified sources. This makes it difficult for software systems to identify sources that may be relevant new entities; thus it is difficult to learn meaningful information about them. While it is, at least in theory, possible to download and analyze every new source, this would not provide any better indication of which sources are new sports entities for which monitoring may be valuable. This results in a technological problem. A growing and constantly changing base of users can, often ostensibly anonymously, post and share content on electronic media sites.

FIGS. 2A-2C are a complete flow chart 200 illustrating a method for processing data relationships on electronic media sites, in accordance with a first exemplary embodiment of the present disclosure. Combined in the order of FIG. 2A, FIG. 2B, and FIG. 2C, the flow chart 200 illustrates the entire method.

FIG. 2A illustrates steps 210-240.

Step 210 shows receiving a first data string having identification information corresponding to a first account on an electronic media site. The first data string may include identification information such as an account name, username, e-mail address, avatar, profile picture, account number, IP address, and the like. The identification information may be specific to a particular electronic media site, such as a Twitter® username, or it may be generalized, such as an IP address. The first data string may be received by a user's computer device for further processing according to the remaining steps.

Step 220 shows receiving a second data string having content information corresponding to at least one submission on the electronic media site by the first account. In one example, the second data string may be sent independently of the first data string. In another example, the second data string and the first data string may together comprise at least a portion of an electronic media post, and may be received at substantially the same time. The content information may correspond to the content of the electronic media post, and may include text, images, video, audio, links, attachments, data, or any combination thereof. The content information of the second data string may include mentions, metadata tags, text content, image content, and audio content. In one example, the content information may contain a portion of a conversation between a user of the first account and another user. For instance, a fan of a sports team may submit a post with text congratulating the sports team on a recent victory. In another example, the content information may be directed to a plurality of users on the electronic media site. For instance, a sports league may post about an upcoming event involving several teams.

Step 230 shows determining a content identifier of the at least one submission by applying an analytical processing function to the second data string, wherein the analytical processing function comprises at least one from the group consisting of: key word identification, proximity word identification, image feature detection, language modeling, and sound fingerprinting. A content identifier may be an indicator of the type or substance of the at least one submission. A content identifier is a determined value or characterization made by analyzing the at least one submission. The analytical processing function applied to the at least one submission may be one or more algorithms, software programs, or methods suitable for analyzing the submission content. Key word identification may be performed by analyzing the text of a submission to determine whether there are key words present that identify the type or substance of a submission. For example, the analytical processing function may filter out words such as articles and pronouns while focusing on words that appear to be nouns and verbs. Proximity word identification may be performed by analyzing words in proximity to each other. For example, the analytical processing function may identify the words closest to a key word to determine whether they are significant. Image feature detection may be performed using computer vision techniques to identify subject matter in electronic images. The feature detection techniques may attempt to identify portions of the visual media as having features, such as the outline of a logo or a color scheme. A neural network may be used to detect features and determine contexts for the commercial brand indicators. Language modeling includes analyzing spoken words to determine content, context, and meaning. In one example, the computer may look for portions of language that match key words, such as brand names, player names, team names, event names, and the like. Sound fingerprinting includes creating a unique digital identifier for a sound based on audio characteristics such as frequency, amplitude, relative intensity, and the like. In one example, the analytical processing function may attempt to identify portions of the audio file that match the sound fingerprint. After finding a match, language parsing or other processing techniques may be used to determine a context and other details. Any of these analytical processing techniques may be used in combination with the others. Depending on the nature of the at least one submission, multiple techniques may be required to fully understand the nature of the content.

In one example, the determination of the content identifier may be made by comparing processed submission content against a pre-determined database of content identifiers. This may allow the process to identify the type of content. For example, the database of content identifiers may include rough identifier categories such as text, image, video, audio, and the like. In another example, each rough identifier may be further divided into fine identifiers. Text may include categories such as nouns, verbs, phrases, opinions, names, places, and the like. Image, video, and audio content may include similar categories, as well as categories for color schemes, location recognition, theme songs, and the like. The content identifier designations may be useful for separating a portion of the at least one submission that is relevant to the process from content that is not relevant. For example, a portion of a text submission may contain spelling errors, extraneous wording, or references to unrelated entities. In one example, the determination of the content identifier may include determining the portion containing the irrelevant content along with the portion containing the relevant content. The relevant content may be used to determine a content identifier and subjected to further processing of the content as discussed below.

Step 240 shows correlating the determined content identifier of the at least one submission with a database of identified content to identify at least a portion of the content corresponding to at least one indicator of a data relationship between the first account and a second account on the electronic media site. The database of identified content may be a remote database accessible over a network connection, such as the Internet, intranet, LAN, WLAN, Wi-Fi, satellite, or other similar network. The database may contain content that has previously been identified. The database content may be regularly updated with new content, including content identified during this process. New content may be automatically added to the database if it is identified with a certainty above a confidence level.

The determined content identifier may be correlated with the database by comparing the determined content identifier with entries in the database. Compared entries that are analyzed to be similar may receive a confidence score depending on their similarity. For example, a determined content identifier saying "I'm excited to join the team!" may be compared with an entry saying "the team." The comparison may result in a high confidence score if the software program determines that the correlation is high. Results with a high confidence score may be considered strong indicators of a data relationship between the first and second accounts. The indicators may not indicate the data relationships themselves, but may only indicate the presence of a relationship. For example, the above result may indicate that there is a data relationship because the content sufficiently matched an entry in a database. Further analysis may be required to fully determine the type of relationship and the entities involved.

In one example, the data relationship between the first and second accounts may not be previously known. The determined content identifier may indicate the presence of a relationship without further indicators of the type of relationship. In another example, the step of correlating the determined content identifier of the at least one submission with a database of identified content further comprises: determining a type of the content identifier; determining a type of the identified content; and matching at least a portion of the content identifier with at least one entry of the identified content.

FIG. 2B continues with steps 250-280.

Step 250 shows determining a value of the at least one indicator to the data relationship between the first and second accounts, wherein the value of the at least one indicator is based on a product of: a content of the indicator, a context of the indicator, a frequency of the indicator, a recency of the indicator (e.g., a time or timeliness of the indicator), and a volume of the indicator. Once the at least one indicator to the data relationship has been identified, a numerical value may be assigned to the data relationship. Accounts having stronger relationships may be assigned higher numerical values, while accounts having weaker relationships may be assigned lower values. The strength of a relationship may be determined as a product of: a content of the indicator, a context of the indicator, a frequency of the indicator, a recency of the indicator, and a volume of the indicator. The content of the indicator may be content identified in steps 230 and 240. Submissions with more content relevant to one or both of the accounts may receive a higher value. For instance, if the majority of the content of a submission is related to a relationship between both accounts, it may receive a high value. If the content of the submission is only tangentially related to one or the other account, it may receive a low value. Submissions with more relevant context related to one or both of the accounts may receive a higher value. For instance, a submission discussing a recent event or important fact may receive a higher value, while a submission discussing an insignificant event may receive a lower value. Submissions made more frequently may receive a higher value. For instance, when considered along with multiple submissions, a submission made often may receive a higher value than a one-time submission. Submissions made more recently may receive a higher value. For instance, a submission made last week may receive a higher value than a submission received 6 months previous. Submissions made more often may receive a higher value. For instance, a submission using a trending hashtag may receive a higher value than a submission with an obscure reference. Each of these factors may combine to influence the final, overall value. In one example, each factor may be weighted to influence the overall value differently than each other factor. For instance, the content and recency may influence the overall value more than the context of a submission. Or the volume of the indicator may affect the overall value more than the other categories combined.

Step 260 shows receiving a third data string having identification information corresponding to the second account. The third data string may be part of the at least one submission. In one example, the third data string may be a reference or a hashtag in the body of the submission. For instance, a submission from an athlete saying, "I can't wait to join the team @TeamName!" may reference a second account belonging to a sports team using the @mention. In another example, the submission may be posted on a second account's wall to a second account's page, or otherwise made in a way directed specifically to the second account. The third data string may pull the identity of the second account from the wall or page.

Step 270 shows processing the first and third data strings to determine identities of the first and second accounts. In one example, one of the accounts may be previously known. For instance, the software application may maintain a database of currently existing sports entities, including the types of sports entities shown in FIG. 1. The database may further include entities such as fans that subscribe to mailing lists, purchase event tickets, follow other sports entities on electronic media sites, or otherwise identify themselves as a sports entity. Entities such as sports franchises, teams, and federations may be less fluid and may be easier to keep track of in a database. When the first and third data strings are processed, they may be compared against the database of previously known accounts, if one of the accounts is previously known, it may generate a match against the database. The relationship indicator determined in step 240 may then be used to extrapolate the identity of the other account. For example, if the second account is determined by a database comparison to be a sports team, and the relationship indicator indicates a strong relationship between the sports team and the first account, it may be determined that the first account belongs to an entity commonly having a strong relationship with the sports team. The new account may be entered into the database as a new sports entity.

Step 280 shows assigning a relationship designation between the first and second accounts based on the determined value and the determined identities of the first and second accounts. The relationship designation may be a substantive determination of the nature and value of the relationship between the entities controlling the first and second accounts. The relationship designation may be determined by applying the relationship indicator determined relative to step 240 above to one or both of the entities identified in step 270. For instance, the result discussed relative to step 240 above may be a strong indicator that the first and second accounts have a team-player relationship. Other results may indicated one or more of the different types of relationships shown in FIG. 1, such as fan-sport, event-venue, league-federation, and the like. The relationships may be determined based on the context of the entries in the database. For instance, text content with words such as a team name, event, sport, or brand may be associated with that respective type of relationship. Image or video content with multiple players may be associated with a team, event, or venue relationship.

In one example, the relationship designation may indicate that the relationship between the first and second accounts is new or previously unknown. This may include a special title, data modifier within a software application performing the process, or other indicator. The indication may be useful for tracking the value and utility of new relationships as they are discovered and catalogued during the process. New relationships may also be tracked to shown trends as new relationships become more valuable or more popular.

In one example, the step may further include defining a threshold value for the determined value of the at least one indicator, wherein an indicator with a determined value above the threshold value is automatically assigned a relationship designation between the first and second accounts, and an indicator with a determined value below the threshold value is further analyzed.

FIG. 2C continues with step 290. Step 290 shows receiving a fourth data string selected from a plurality of data strings according to a priority determined by a plurality of relationship designations between the second account and a plurality of other accounts including the first account, wherein the fourth data string has content information corresponding to at least one submission on the electronic media site by the first account. The fourth data string may include one or more additional submissions on the electronic media site. The second account may be directed to, tagged in, mentioned, or tweeted at by a high volume of entities on the electronic media site. Many of these entities may be unknown. It may be important to receive and process communications from a number of these entities.

Step 290 may allow a user of the software application to prioritize which submissions are received and viewed by comparing the relationship designation and value of each submission and selecting the highest value submissions to be received and viewed first. Submissions between account pairs having higher values as determined above may receive priority. For instance, it may be determined that the relationship between an account belonging to a team and a first account belonging to a star athlete is more valuable than the relationship between an account belonging to a team and an account belonging to a media organization. Submissions from the first account belonging to the star athlete may be received and processed before submissions from the account belonging to the media organization.

Generally, accounts held by unknown entities may appear frequently and may direct submissions to known entities. Along with other unknown accounts, these submissions may constitute a substantial volume of potential data to be received. By prioritizing the data based on the relationship designation and value between the known account and the unknown accounts, submissions made by unknown accounts can be identified, valued, and prioritized. Specifically, as applied to sports entities, the interactions between existing sports entities and new accounts belonging to unknown sports entities can be processed efficiently.

In one example, the method may further comprise the steps of: receiving a fifth data string having content information corresponding to at least one submission on the electronic media site by the second account to the first account; determining a content identifier of the at least one submission by applying an analytical processing function to the fifth data string, wherein the analytical processing function comprises at least one from the group consisting of: key word identification, proximity word identification, image feature detection, language modeling, and sound fingerprinting; correlating the determined content identifier of the at least one submission with a database of identified content to identify at least a portion of the content corresponding to at least one indicator of a data relationship between the first account and a second account on the electronic media site; determining an updated value of the at least one indicator to the data relationship between the first and second accounts, wherein the value of the at least one indicator is based on a product of: a content of the indicator, a context of the indicator, a frequency of the indicator, a recency of the indicator, and a volume of the indicator; and assigning an updated relationship designation between the first and second accounts based on the determined updated value and the determined identities of the first and second accounts. In this way, future submissions by the second account to the first account can be tracked and analyzed over time. As the relationship status of the entities controlling the accounts changes in nature or intensity, the relationship designation may be updated to reflect the changing priority. As the priority is updated, future submissions may be pulled more or less often.

In one example, the method for processing data relationships on electronic media sites may include an entity suggestion engine, an entity discovery engine, and a relationship mapping and scoring engine. These engines may be additional steps located at any point in the process and in any order. The additional steps may be performed individually (i.e., for a single engine), or as a combination of engines.

The entity suggestion engine may identify entities that are mentioned in electronic media posts but not currently within any priority database. The engine may suggest an entity based on the identity of entities mentioned in electronic media submissions and based on the context of the submissions. The strength of the suggestion, i.e., the indicator of the importance of the suggested entity, may be measured and determined by a volume of mentions on the electronic media site. Natural language processing methods may be used to determine content from the submission, and a model may be created to determine whether the account behind the submission belongs to a relevant entity. An entity suggestion may be created once the model determines a high probability of a relevant entity.

The entity data discovery engine may mine data from known or new entities in order to learn more about each entity. For example, data mined may include the entity's location, age (or length of doing business), gender (if human), relevant hashtags used, keywords used, and the like. The entity data discovery engine may designate the entity as stronger or weaker depending on the data discovered. In one example, an athlete may geotag a number of locations in San Diego, Calif. in a large percentage of their electronic media posts. The athlete may mention other athletes from San Diego, or otherwise make consistent reference to San Diego. Using the location data derived from these submissions, it can be determined that the athlete resides in San Diego. As another example, a team may use a hashtag in its electronic media posts. The hashtag may not relate to any known entities, but the fans of the team may also use the hashtag. Using the data mined from the team and the fans using the hashtag, it can be determined that the team has a relationship with the fans.

Some examples of entity data may include social handles, entity website, age, gender, location, interests, personality, exclusive hashtags, exclusive keywords, position, skill level, and the like. Social handles may include usernames or public identifiers on sites like Twitter®, Facebook®, Instagram®, Weibo®, and the like. Entity websites may include websites or pages operated by, on behalf of, or pertaining to the entity. This may include official sites and pages, as well as fan-made or unapproved sites and pages. Age may include a human person's age or a commercial group's length of time in business. Location may include a human person's current location, domicile, or base, and may include a commercial group's commercial location. Interests may include personal interests, hobbies, professional connections, professional relationships, and the like. Personality may include one or more classifications basal on a personality assessment to determine characteristics and trends of a human person's personality. Exclusive hashtags and keywords may include hashtags and keywords that are generally used to refer only to the particular entity or are generally only used by the particular entity. Position may include the entity's position within an organization. For instance, an athlete may have a position of quarterback, goalie, captain, and so on. Skill level may refer to the entity's classification within the organization, and may include categories such as professional, amateur, minor or major league, division, and the like.

The relationship mapping and scoring engine may identify relationships between entities based on the entities mentioned in submissions as well as the entities mentioning them. Relationships between known entities may be assigned weights and strengths based on the frequency, recency, and reciprocation of submissions between accounts controlled by known entities. In one example, the more frequently and recently an entity is mentioned in submissions, and the more that entity reciprocates mentions with other entities, the stronger the relationship may be determined to be. In another example, a snowboarding athlete may mention an event such as the X-games with an @mention, using additional text to indicate travel to the X-games, it can be determined that the athlete is participating in the event. In another example, a soccer club may mention a brand consistently 5-10 times per month over a period of 6 months. The brand may mention the club back once per month. It can be determined that there is a sponsorship relationship between the accounts belonging to the brand and the soccer club. The more frequent the reciprocal messaging, the stronger the relationship may be.

Relationships may be determined from relationship data. Examples of relationship data may include relationships between entities that are human persons, team affiliation, venue affiliation, league affiliation, event participation, competitive affiliation, brand affiliation, and the like. Relationships between entities that are human persons may include personal relationships, such as friendships, mentorships, partnerships, and the like. Team affiliation may include information corresponding to the team or organization to which an athlete belongs, including the nature and length of affiliation. Venue affiliation may include information corresponding to the venue where a team or organization generally plays or participates. League affiliation may include the league or organization in which a team plays. Event participation may include any particular events in which a team has participated, including competitions, playoff series, special games, seasons, and the like. Competition affiliation may include any athletes, teams, or organizations against which an entity has competed, and may include the dates, number of competitions, locations, outcomes, and the like. Brand affiliation may include any brands or commercial entities with which an entity is employed or otherwise affiliated, and may include any relevant entity data. Any relationship data may include relevant entity data, which may provide more complete information regarding the relationship being examined.

Figure 3:
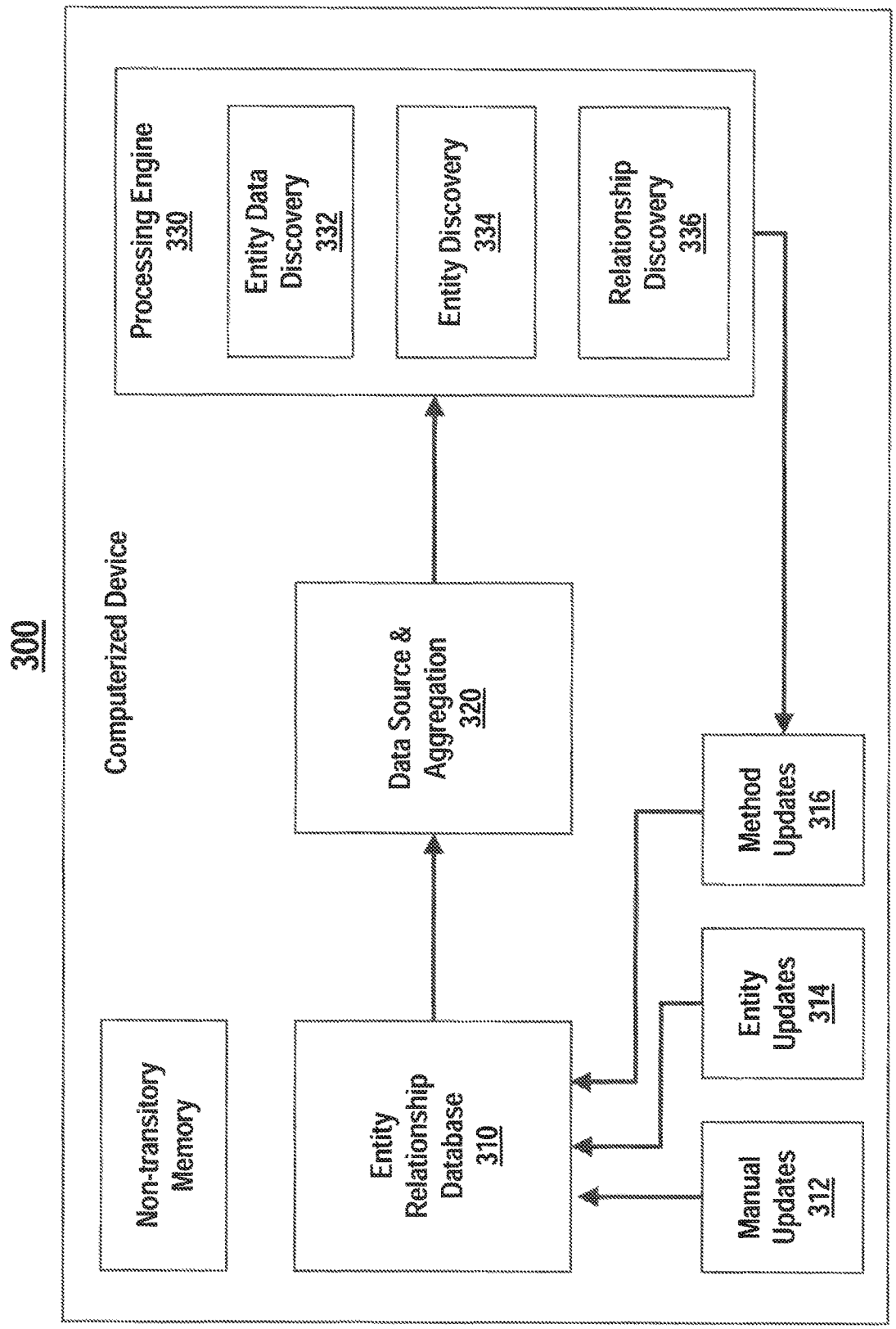
FIG. 3 is a flow chart 300 showing an exemplary software system using the method of FIGS. 2A-2C, in accordance with the first exemplary embodiment of the present disclosure.

FIG. 3 is a flow chart 300 showing an exemplary software system using the method of FIGS. 2A-2C, in accordance with the first exemplary embodiment of the present disclosure.

Block 310 shows an entity relationship database. The entity relationship database may include any of the entity data, relationship data, metadata, and related data discussed above. The entity relationship database may be populated and updated through manual updates 312, entity updates 314, and method updates 316. Manual updates 312 may be created manually, using a core source of accurate information. The information may be received and may be relevant to a core group of entities having electronic media accounts. The information may include any of the data discussed above relative to the core group of entities. Domain expertise may guide the collection of this information. Entity updates 314 may be updates provided by the entities being stored and tracked in the entity relationship database. Entities may provide this information through updated postings on electronic media sites, manual entry, or any other suitable method. Method updates 316 may be provided when new entity or entity relationship data has been determined using the method of FIGS. 2A-2C.

Block 320 shows the process of data source and aggregation. This may include aggregating data from one or more electronic media sites or other platforms.

Block 330 shows the data processing engine, which may include an entity data discovery engine 332, an entity discovery engine 334, and a relationship discovery engine 336. The entity data discovery engine 332 may discover and collect data from new and unknown entities. More entity data may be collected on the core group of entities. Machine learning or natural language processing models may be trained with previously-acquired data and may be used to determine where important data is missing. Entity data may be received from first or third-party data sources. Entity discovery engine 334 may determine the identity of a new entity. The entity data collected in the previous step may suggest new entities of importance that should be tracked. The data from the existing entities may be used to identify the content, context, or mentions of new entities. Models may analyze the context of mentions, such as the entity mentioning and frequency of mentions, in order to determine an entity type for the new entities. If the identity of a new entity is confirmed on one platform, that information may be used to identify the entity on additional platforms and collect entity data from those sources as well. The relationship discovery engine 336 may discover the relationship between known entities and new entities. Once the identities of foe entities have been established, machine learning models may be trained based on the relationship types and relationships that have been verified. Text, visual, and audio mentions between entities, frequency of contact, recency of contact, volume, and sentiment may be used to predict a relationship between the entities. First and third-party data may be used to confirm these relationships to within a desired degree of confidence or above a particular threshold value. Once entity and relationship data are sufficiently determined, the entity relationship database may be updated using a method update 316.

Operating Examples

The method may be shown in a number of exemplary use cases, discussed below.

In one example, the method may be used to identify one or more teammates having accounts on electronic media sites. For instance, if one athlete on a team mentions their team affiliation through content, mentions, or context, that athlete's team affiliation may be determined. If that athlete also mentions a team member through content, mentions, or context, it can be determined that the team member belongs to the same team. This may allow foe database to be updated with accurate rosters and valuation models.

In another example, the method may be used to identify the influence a first athlete having an account on electronic media sites may have over other athletes. Relationships between the first athlete and the other athletes may be determined, and a numerical influence value may be assigned based on the strength data discussed above. A brand or other entity may use this information to seed products with the first athlete in order to influence other athletes within the first athlete's sphere of influence.

In another example, the categorization of entity types may be used to predict specific relationships based on direction, recency, sentiment, and the like.

In another example, the method may be used to continually identify important information about an entity, which itself may be used to identify additional entities and the relationships between them. For instance, if a baseball player athlete geotags themselves in Toronto during the Toronto team's home games, this can be used to infer that the baseball player plays for the Toronto baseball team.

In another example, the method may be used to integrate new entities through previously acquired data. For instance, if data is received showing that a team mentions an unknown entity on Instagram®, the unknown entity's account data may be analyzed for entity data. The unknown entity's type may be determined, and the entity may be added to the database. All of the other entities in the database may then be analyzed to determine one or more relationships through content, mentions, or context of previously-acquired data.

In another example, the method may be used to identify the leader of an entity, such as a CEO, having an electronic media account. The leader's posts may be analyzed to determine the leader's interests, hobbies, and the like. These may in turn be used to provide a competitive advantage to another entity desiring to create a commercial relationship with the entity which the CEO leads. For instance, identifying the coach of a team and determining his or her affinity for a particular brand may assist another brand in deciding to work with the team.

The method may further include any other features, components, or functions disclosed relative to any other figure of this disclosure. It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for processing data relationships on electronic media sites using a computerized device having a processor and a non-transitory memory, the method comprising the steps of:
receiving, by the processor, a first data string having identification information corresponding to a first account on an electronic media site, wherein the first data string is in a first portion of a submission by the first account;
receiving, by the processor, a second data string having content information comprising at least a second portion of the submission on the electronic media site by the first account;
determining, by the processor, a content identifier of the submission by applying an analytical processing function to the second data string, wherein the analytical processing function comprises at least one from the group consisting of: key word identification, proximity word identification, image feature detection, language modeling, and sound fingerprinting;
correlating, by the processor, the determined content identifier of the submission with a database of identified content to identify at least a portion of the content information corresponding to at least one indicator of a data relationship between the first account and a second account on the electronic media site;
determining, by the processor, a value of the at least one indicator to the data relationship between the first and second accounts, wherein the value of the at least one indicator is based on a product of: a content of the indicator, a context of the indicator, a frequency of the indicator, and a volume of the indicator;
receiving, by the processor, a third data string having identification information corresponding to the second account, wherein the third data string is in a third portion of the submission by the first account;
processing, by the processor, the first and third data strings to determine identities of the first and second accounts;
assigning, by the processor, a relationship designation indicative of a real-world relationship between users of the first and second accounts based on the determined value and the determined identities of the first and second accounts; and
receiving, by the processor, a fourth data string selected from a plurality of data strings according to a priority determined by a plurality of relationship designations between the user of the second account and users of a plurality of other accounts including the first account, wherein the fourth data string has content information corresponding to the submission on the electronic media site by the first account.

2. The method of claim 1, wherein the content information of the second data string is at least one from the group consisting of: mentions, metadata tags, text content, image content, and audio content.

3. The method of claim 1, wherein the value of the at least one indicator is proportional to an amount of the content information relating to the second account.

4. The method of claim 1, wherein the data relationship between the first and second accounts is not previously known.

5. The method of claim 1, wherein the relationship designation indicates a new relationship between the users of the first and second accounts.

6. The method of claim 1, wherein the step of correlating the determined content identifier of the submission with a database of identified content further comprises:
determining, by the processor, a type of the content identifier;
determining, by the processor, a type of the identified content; and
matching, by the processor, at least a portion of the content identifier with at least one entry of the identified content.

7. The method of claim 1, further comprising the step of adding, by the processor, the content identifier to the database of identified content.

8. The method of claim 1, further comprising the step of defining, by the processor, a threshold value for the determined value of the at least one indicator, wherein an indicator with a determined value above the threshold value is automatically assigned a relationship designation between the users of the first and second accounts, and an indicator with a determined value below the threshold value is further analyzed.

9. The method of claim 1, wherein the electronic media site further comprises a virtual networking website or social media platform.

10. The method of claim 1, further comprising the steps of:
receiving a fifth data string having content information comprising at least a portion of at least one submission on the electronic media site by the second account to the first account;
determining a content identifier of the at least one submission by applying an analytical processing function to the fifth data string, wherein the analytical processing function comprises at least one from the group consisting of: key word identification, proximity word identification, image feature detection, language modeling, and sound fingerprinting;
correlating the determined content identifier of the at least one submission of the fifth data string with a database of identified content to identify at least a portion of the content information corresponding to at least a second indicator of a data relationship between the first account and a second account on the electronic media site;
determining a value of the at least second indicator of the data relationship between the first and second accounts, wherein the value of the at least second indicator is based on a product of a content of the indicator, a context of the at least second indicator, a frequency of the at least second indicator, a recency of the at least second indicator, and a volume of the at least second indicator; and
assigning an updated relationship designation between the users of the first and second accounts based on the determined values of the at least first and second indicators and the determined identities of the first and second accounts.

11. A computer-implemented system for processing data relationships on electronic media sites using a computerized device having a processor and a memory, wherein the processor is configured for executing steps, the computer-implemented system comprising:
receiving, by the processor, a first data string having identification information corresponding to a first account on an electronic media site, wherein the first data string is in a first portion of a submission by the first account;
receiving, by the processor, a second data string having content information comprising at least a second portion of the submission on the electronic media site by the first account;
determining, by the processor, a content identifier of the submission by applying an analytical processing function to the second data string, wherein the analytical processing function comprises at least one from the group consisting of: key word identification, proximity word identification, image feature detection, language modeling, and sound fingerprinting;
correlating, by the processor, the determined content identifier of the submission with a database of identified content to identify at least a portion of the content information corresponding to at least one indicator of a data relationship between the first account and a second account on the electronic media site;
determining, by the processor, a value of the at least one indicator to the data relationship between the first and second accounts, wherein the value of the at least one indicator is based on a product of: a content of the indicator, a context of the indicator, a frequency of the indicator, and a volume of the indicator;
receiving, by the processor, a third data string having identification information corresponding to the second account, wherein the third data string is in a third portion of the submission by the first account;
processing, by the processor, the first and third data strings to determine identities of the first and second accounts;
assigning, by the processor, a relationship designation indicative of a real-world relationship between users of the first and second accounts based on the determined value and the determined identities of the first and second accounts; and
receiving, by the processor, a fourth data string selected from a plurality of data strings according to a priority determined by a plurality of relationship designations between the user of the second account and users of a plurality of other accounts including the first account, wherein the fourth data string has content information corresponding to the submission on the electronic media site by the first account.

12. The system of claim 11, wherein the content information of the second data string is at least one from the group consisting of: mentions, metadata tags, text content, image content, and audio content.

13. The system of claim 11, wherein the value of the at least one indicator is proportional to an amount of the content information relating to the second account.

14. The system of claim 11, wherein the data relationship between the first and second accounts is not previously known.

15. The system of claim 11, wherein the relationship designation indicates a new relationship between the users of the first and second accounts.

16. The system of claim 11, wherein correlating the determined content identifier of the submission with a database of identified content further comprises:
determining a type of the content identifier;
determining a type of the identified content; and
matching at least a portion of the content identifier with at least one entry of the identified content.

17. The system of claim 11, further comprising adding, by the processor, the content identifier to the database of identified content.

18. The system of claim 11, further comprising defining, by the processor, a threshold value for the determined value of the at least one indicator, wherein an indicator with a determined value above the threshold value is automatically assigned a relationship designation between the users of the first and second accounts, and an indicator with a determined value below the threshold value is further analyzed.

19. The system of claim 11, further comprising:
receiving, by the processor, a fifth data string having content information comprising at least a portion of at least one submission on the electronic media site by the second account to the first account;
determining, by the processor, a content identifier of the at least one submission by applying an analytical processing function to the fifth data string, wherein the analytical processing function comprises at least one from the group consisting of: key word identification, proximity word identification, image feature detection, language modeling, and sound fingerprinting;
correlating, by the processor, the determined content identifier of the at least one submission of the fifth data string with a database of identified content to identify at least a portion of the content information corresponding to at least a second indicator of a data relationship between the first account and a second account on the electronic media site;

determining, by the processor, a value of the at least second indicator to the data relationship between the first and second accounts, wherein the value of the at least second indicator is based on a product of a content of the at least second indicator, a context of the at least second indicator, a frequency of the at least second indicator, a recency of the at least second indicator, and a volume of the at least second indicator; and assigning an updated relationship designation between the users of the first and second accounts based on the determined values of the at least first and second indicators and the determined identities of the first and second accounts.

20. The system of claim 11, wherein the electronic media site further comprises a virtual networking website or social media platform.

\* \* \* \* \*